US006819927B1

(12) United States Patent
Sato

(10) Patent No.: US 6,819,927 B1
(45) Date of Patent: *Nov. 16, 2004

(54) COMMUNICATION METHOD FOR USE BY A MOBILE STATION IN A MOBILE COMMUNICATION SYSTEM OF CDMA

(75) Inventor: Takaaki Sato, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

This patent is subject to a terminal disclaimer.

(21) Appl. No.: 09/612,372

(22) Filed: Jul. 7, 2000

Related U.S. Application Data

(62) Division of application No. 08/946,834, filed on Oct. 8, 1997.

(30) Foreign Application Priority Data

Oct. 18, 1996 (JP) .............................................. 8-295924

(51) Int. Cl.[7] ................................................. H04Q 7/20
(52) U.S. Cl. ........................ 455/437; 455/436; 455/442
(58) Field of Search .................................. 455/436, 437,
455/438, 439, 440, 442, 444, 447, 464,
63, 67, 65, 67.3, 73, 565, 506; 370/331,
332, 333, 335, 342, 252

(56) References Cited

U.S. PATENT DOCUMENTS

| 5,199,045 A | | 3/1993 | Kato |
| 5,335,356 A | * | 8/1994 | Andersson .................. 455/517 |
| 5,343,494 A | | 8/1994 | Averst et al. |
| 5,390,234 A | | 2/1995 | Bar-Noy et al. |
| 5,613,218 A | | 3/1997 | Li et al. |
| 5,640,414 A | | 6/1997 | Blakeney et al. |
| 5,678,185 A | | 10/1997 | Chia |
| 5,771,451 A | | 6/1998 | Takai et al. |
| 5,828,659 A | | 10/1998 | Teder et al. |
| 5,844,935 A | | 12/1998 | Shoji |
| 5,859,612 A | | 1/1999 | Gilhousen |
| 5,878,350 A | * | 3/1999 | Nakamura et al. .......... 455/442 |
| 5,884,187 A | | 3/1999 | Ziv et al. |
| 5,893,033 A | | 4/1999 | Keskitalo et al. |
| 5,920,554 A | | 7/1999 | Nakamura et al. |
| 5,983,080 A | | 11/1999 | Gerszberg et al. |
| 6,233,454 B1 | * | 5/2001 | Sato ........................... 455/437 |
| 6,263,010 B1 | * | 7/2001 | Naruse et al. ............... 375/130 |

FOREIGN PATENT DOCUMENTS

| JP | A 3 268697 | 11/1991 |
| JP | A 5 91038 | 4/1993 |
| JP | A 7 203517 | 8/1995 |
| JP | A 8 223107 | 8/1996 |

\* cited by examiner

*Primary Examiner*—Dwayne Bost
*Assistant Examiner*—Jean A Gelin
(74) *Attorney, Agent, or Firm*—Venable LLP; Catherine M. Voorhees

(57) ABSTRACT

A mobile station is provided for autonomously detect an abrupt change of a propagation environment of a radio wave signal from a base station for servicing a peripheral cell and immediately executing a peripheral cell search. In order to execute a received signal strength indication plural times within one period of the peripheral cell search, the mobile station operates to set a cell search execution period $\Delta t1$ to a timer of a peripheral cell search controller and a RSSI measuring execution period $\Delta t2$ to a timer. The RSSI measuring unit operates to measure the RSSI in the receiving band at each RSSI measuring execution period $\Delta t2$ and immediately execute the peripheral cell search when the peripheral cell search controller determines that the RSSI has greatly varied.

2 Claims, 6 Drawing Sheets

COMMUNICATION METHOD FOR USE BY A MOBILE STATION IN A MOBILE COMMUNICATION SYSTEM OF CDMA

CROSS-REFERENCE TO RELATED APPLICATION

This is a division of application Ser. No. 08/946,834, filed Oct. 8, 1997, the disclosure of which is incorporated herein by reference.

BACKGROUND OF THE INVENTION

1. Field of the Invention

The present invention relates to a mobile station included in a mobile communication system such as a mobile telephone or a portable telephone, and more particularly to a mobile station which is arranged to autonomously detect an abrupt change of the quality of a signal received from a peripheral cell and then immediately start to search peripheral cells.

2. Description of the Related Art

A third-generation mobile communication system is planning to employ a CDMA (Code Division Multiple Access) system as a radio access system. The CDMA system is arranged to execute a soft hand-over operation for synthesizing a radio signal from a base station of a current cell (where the mobile station is located) with a radio signal from a base station of a new cell (where the mobile station is moved) as a hand-over when the mobile station is moved from the current cell to the next cell. In order to execute the hand-over, the mobile station is required to do a peripheral cell search for searching for a base station of the next cell.

Each base station is constantly transmitting a radio channel called a perch (or Pilot) channel. The perch channel is transmitted through the use of a diffusion (or spreading) code which is peculiar to that cell (base station). Hence, each base station notifies the mobile station of the diffusion code used in that cell on the perch channel. The mobile station operates to periodically measure the ratio of a target signal to interference noise (SIR: signal-to-interference ratio) of the radio channel (the perch channel of the peripheral cell) that corresponds to the notified diffusion code and then notifies the network of the measured result. Herein, the SIR has the same meaning as the "received signal quality", which will be often used below. This operation is called a peripheral cell search. The network determines to which cell the mobile stations is moving.

The action of the conventional mobile station about executing the peripheral cell search will be described with reference to FIG. 1.

(Step 1)

The mobile station (terminal) receives the perch channel, obtains the information about diffusion codes used by the peripheral cells, and stores it.

(Step 2)

The mobile station sets a cell search execution period $\Delta t$ to a timer. When the timer is counted up, the operation goes to a step 3.

(Step 3)

A reverse diffusion (or de-spreading) process is executed by sequentially using the stored diffusion codes for the peripheral cells, for the purpose of measuring the SIR of each cell.

(Step 4)

The mobile station notifies the network of the result of the peripheral cell search. Herein, the description is explained in the case where the result is reported to the network each time the peripheral cell search is executed. However, the report is not necessarily required for each peripheral cell search. After the result of the peripheral cell search is reported to the network, the operation goes back to the Step 2.

As described above, the mobile station executes the peripheral cell search at a period $\Delta t$ and reports the received signal quality from the peripheral cell to the network. If the network determines the mobile station is to be shifted to the peripheral cell based on the report about the received signal quality, the network gives an instruction for a soft hand-over with a target base station (where the mobile station is to be moved) to the mobile station.

However, the foregoing peripheral cell search is executed to measure the received signal quality from the peripheral cell at each period $\Delta t$. Hence, if the received signal quality from the peripheral cell is abruptly changed, disadvantageously, in the worst case, the abrupt change cannot be detected until $\Delta t$ is passed. The abrupt change of the received signal quality from the peripheral cell may take place when a base station is moved from a place located out of sight, concretely, behind a building to a place located in sight with movement of the mobile station or when continuous changes take place from one base station located in sight to another one in the case of a mobile station moving in a mountain area.

In order to detect the change of the received signal quality from the peripheral cell as soon as possible, a method may be taken for reducing $\Delta t$. This method, however, requires the mobile station in communication to execute the peripheral cell search with the reverse diffusion at a short period. This peripheral cell search thus increases the processing amount of the mobile station and thereby increases the electric current consumption which results in reducing the using time of the mobile station.

On the other hand, a method for dynamically tracing a mobile station in a cellular network is disclosed in U.S. Pat. No. 5,390,234. In this method, only after the mobile station is turned on and moved by a minimum distance, does the mobile station gives a report to the base station. If the base station needs to communicate with the mobile station, the mobile station is searched only close to the last cell reported by the mobile station to the base station. However, this method provides no capability of coping with an abrupt change of the received signal quality from the peripheral cell.

Further, JP-A-3-268697 discloses a mobile radio communication system in which the mobile station itself constantly monitors the radio line quality based on the received field strength and a code error rate of a demodulated signal while the mobile station is moving over a radio zone. When the mobile station detects a degradation of the received signal field strength or the code error rate owing to the movement over the radio zone, the mobile station sequentially compares one base station having a frequency for the current zone through an empty time slot with another base station in light of the field strength of the signal, for the purpose of determining the signal having the strongest field. The mobile station transmits the frequency information of the determined signal to the base station that is communicating with the subject mobile station, for requesting a hand-over. Then, the base station transmits a message for requesting the hand-over to a control station. In response to the message, the control station performs the hand-over. However, this system enables to switch the channel only when the average received signal level is abruptly lowered. Conversely, if the average received signal level is abruptly enhanced, it means that the mobile station is located in the area where lots of obstacles are located. In this area, the mobile station may utilize a more favorable base station. Regrettably, for coping with such a case, the system does not consider selection of a more favorable base station.

Further, JP-A-5-91038 discloses a system for switching channels of mobile communication, in which system, when the variable width of the received signal level stays in a predetermined range, the channel switching level is set to a higher value and when the average received signal level is abruptly lowered, the channel is quickly switched. This system, however, does not have any suggestion of selecting a more favorable base station when the average received signal level is abruptly increased.

Moreover, JP-A-7-203517 discloses a hand-over system having the function of identifying whether a radio base station in communication and a radio base station adjacent thereto are an indoor radio base station or an outdoor radio base station and the function of measuring the field strength received from the adjacent radio base station and a received field strength variation per unit time. In this system, when the mobile station is communicating with the indoor radio base station and the received field strength and the received field strength variation per unit time from the adjacent outdoor radio base station become more than their predetermined values, the mobile station requires the channel change to a outdoor radio base station irrespective of the received field strength from the indoor radio base station in communication. This system, however, may select the base station that does not have the best received field strength or SIR.

As another prior art, JP-A-8-223107 discloses a channel switching determining device for a mobile radio terminal, in which device requests for switching channels are suppressed to a minimum while the mobile radio terminal is moving around an office area with lots of buildings, for the purpose of keeping the communication stable. This device is arranged so that the mobile radio terminal requires to switch communication channels when an average value of bit error rates is inferior to a predetermined value and an average value of received field strengths is lower than a predetermined value. However, this device is not able to cope with an abrupt change of the received signal quality for a period which is shorter than the period when the average value of the bit error rates is measured.

SUMMARY OF THE INVENTION

The present invention is made for overcoming the foregoing shortcomings. It is an object of the present invention to provide a mobile station which includes means for measuring a received signal strength indicator or indication (carrier RSSI, or simply RSSI) of a signal inside of a receiving area before the reverse diffusion with a simple process and without having to do a reverse diffusion process and operates to recognize an abrupt change of a received signal quality from any peripheral cell by detecting a change of the RSSI of the signal inside of the receiving area.

In carrying out the object, according to an aspect of the invention, a mobile station for a CDMA system mobile communication system includes transmitting and receiving means for transmitting and receiving a signal to and from one of plural base stations servicing peripheral cells, received signal level measuring means for measuring a received signal strength indication (RSSI) within a receive band, in the signal received by the transmitting and receiving means, reverse diffusing means for performing a reverse diffusing process with respect to the signal received by the transmitting and receiving means, received signal quality measuring means for measuring a ratio of a target signal to interference noise (SIR) at an output of the reverse-diffusing means, and control means for searching the peripheral cells and controlling the measuring means to measure the SIR at certain periods and at least when change of the RSSI output from the received signal level measuring means exceeds a predetermined value, and for reporting the received signal quality of the peripheral cells to the network through the base station in communication so as to shift the mobile station to a soft hand-over state.

The foregoing arrangement makes it possible to implement an excellent mobile station which operates to autonomously detect an abrupt change of the received signal quality from the peripheral cells and immediately perform a peripheral cell search by measuring the received signal level for a shorter period than the period at which the peripheral cells are searched.

DESCRIPTION OF THE PREFERRED EMBODIMENTS

Hereafter, the embodiments of the invention will be described with reference to FIGS. 2 to 6.
(First Embodiment)

Figure 1:
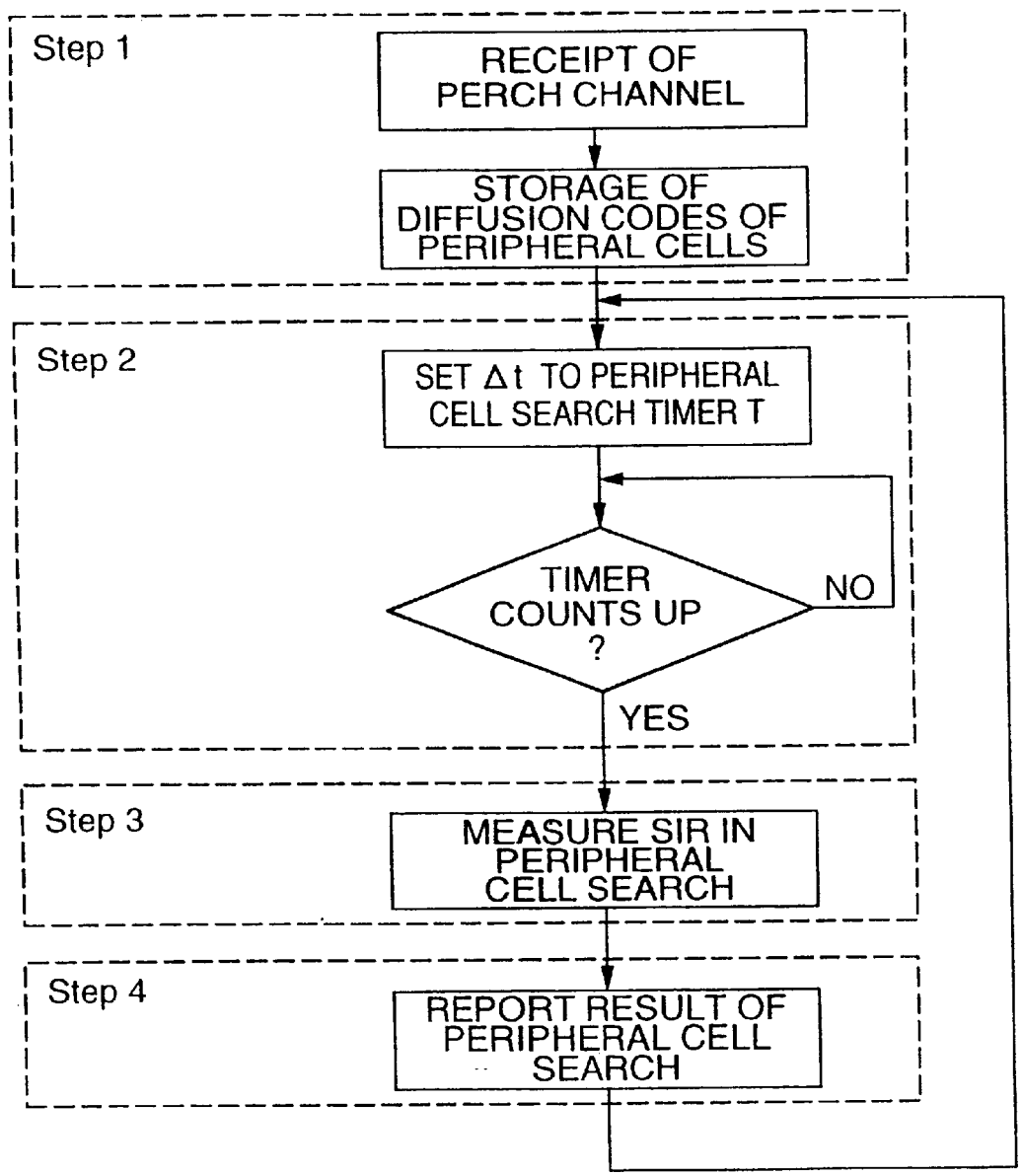
FIG. 1 is a flowchart for illustrating the operation of searching a peripheral cell in a conventional mobile station.
Figure 2:
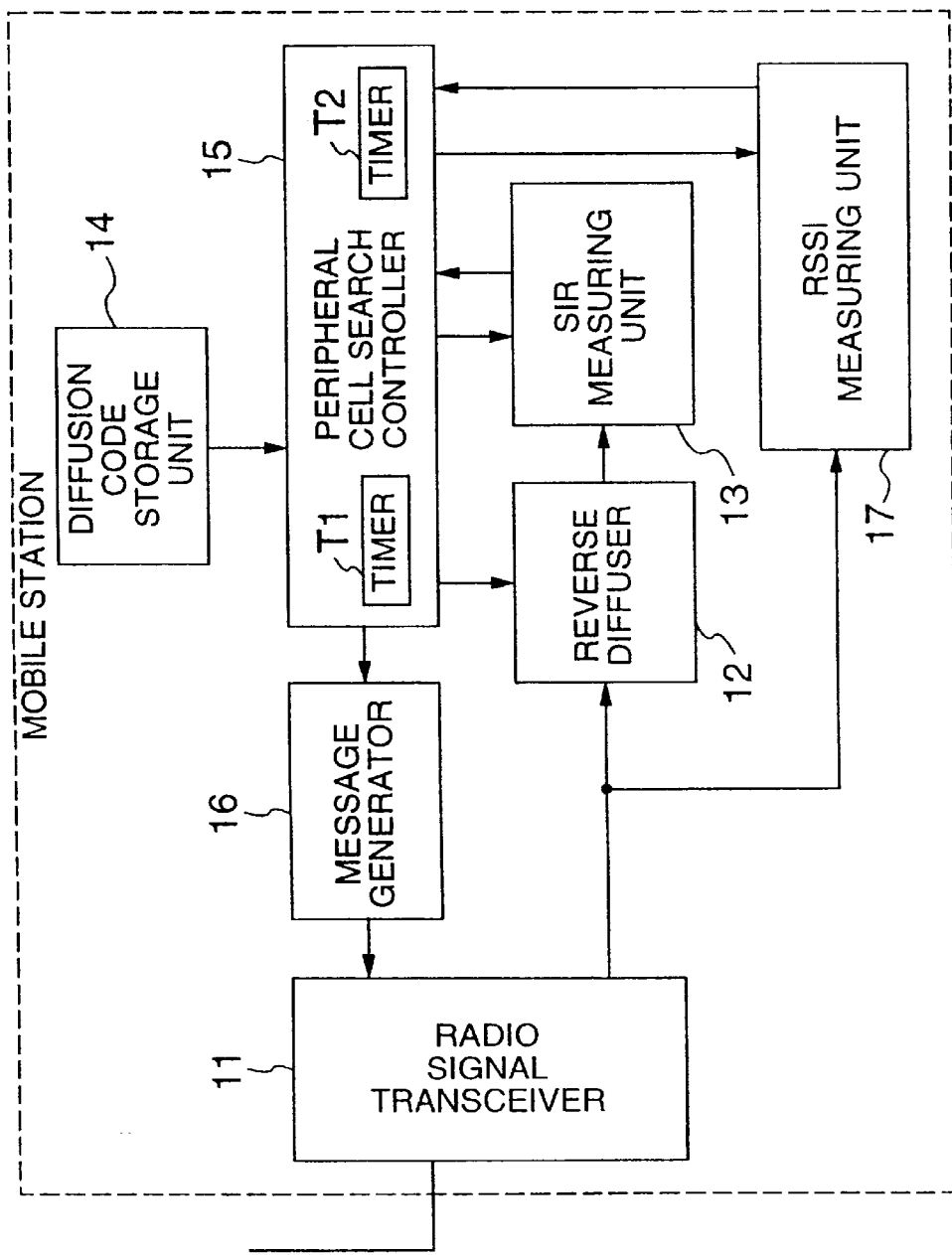
FIG. 2 is a block diagram showing an arrangement of a mobile station according to a first embodiment of the invention.

FIG. 2 is a block diagram showing an arrangement of a mobile station for executing a peripheral cell search according to a first embodiment of the invention. In FIG. 2, the mobile station includes a radio signal transceiver 11 for transmitting and receiving a radio signal to and from a base station, a reverse diffuser (or de-spreader) 12 for reversely diffusing (or de-spreader) a diffused signal received by the radio signal transceiver 11 by using diffusion (or spreading) codes and taking a signal directed to the subject station, a received signal quality measuring unit 13 for measuring the SIR (signal-to-interference ratio) from a signal sent from the reverse diffuser 12, a diffusion code (or spreading code) storage unit 14 for storing the diffusion codes used in the peripheral cells and reported on a perch (or Pilot) channel, a peripheral cell search controller 15 for executing a peripheral cell search at a pre-set timer period, the controller 15 being provided with timers T1 and T2, a message generator 16 for generating a message for reporting to the network the result of the peripheral cell search periodically executed by the peripheral cell search controller 15, and a received signal level measuring unit 17 for measuring a received signal strength indicator or indication (carrier RSSI, or simply RSSI) of a receiving band signal sent from the radio signal transceiver 11.

Figure 3:
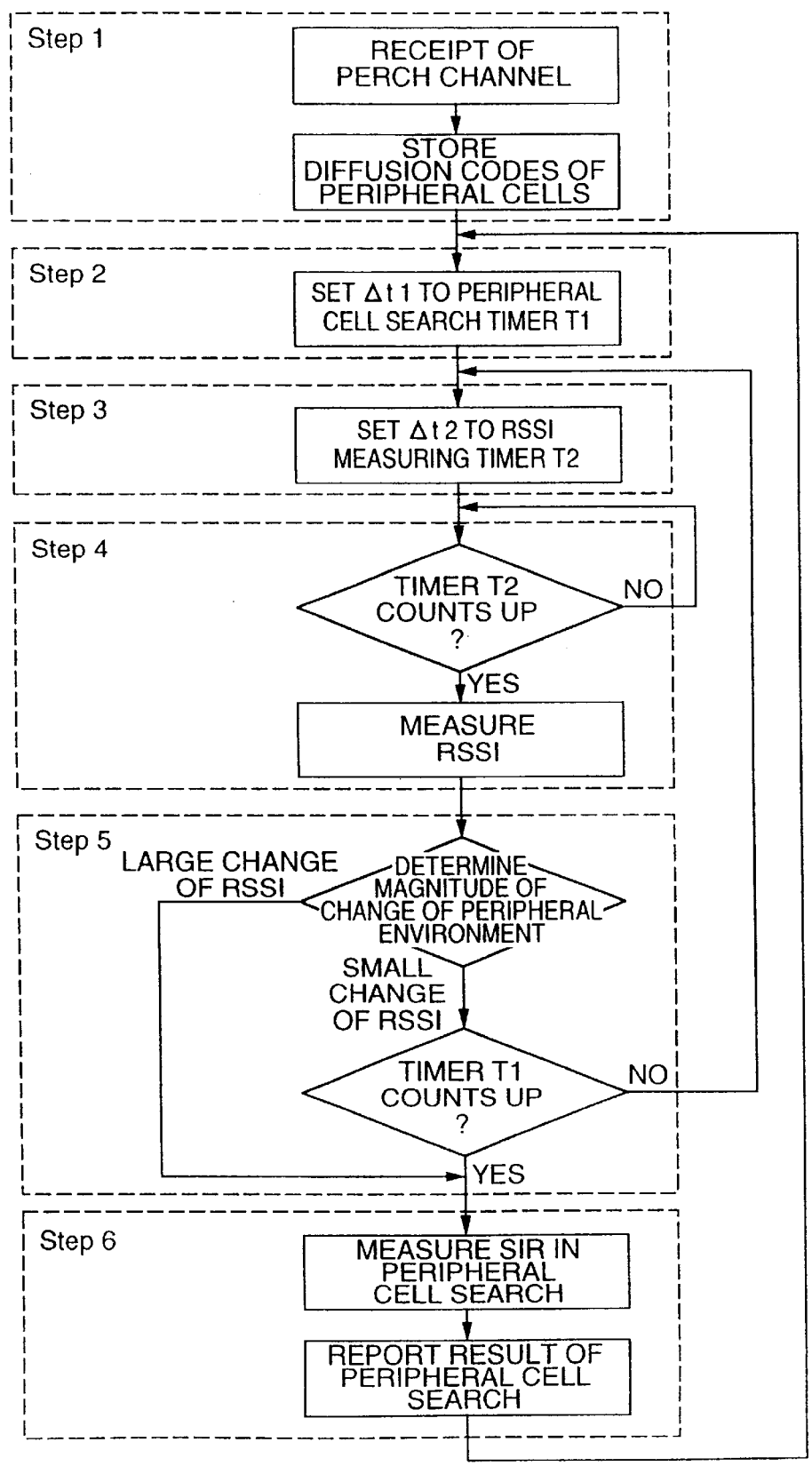
FIG. 3 is a flowchart for illustrating the operation of searching a peripheral cell in the mobile station according to the first embodiment of the invention.

Now the description will be oriented to the operation about executing a peripheral cell search in the mobile station arranged as described above according to the first embodiment of the invention with reference to FIG. 3.

(Step 1)

The mobile station (terminal) receives a signal on the perch channel, obtains the diffusion code information used by the peripheral cells, and stores them in the diffusion code storage unit 14.

(Step 2)

The peripheral cell search controller 15 operates to set a cell search execution period $\Delta t1$ to the timer T1.

(Step 3)

The peripheral cell search controller 15 operates to set a received signal level measurement execution period $\Delta t2$ to the timer T2.

Here, the relation $\Delta t2 < \Delta t1$ is required. Setting $\Delta t2 = \Delta t1/k$ (k=2, 3, 4, ...), by executing the detection of the received signal level signal k times within one period of the peripheral cell search, the detection can be executed at 1/k time of the peripheral cell search period. Hence, the mobile station can recognize an abrupt change of the received signal quality from the peripheral cell.

(Step 4)

When the timer T2 is counted up, the peripheral cell search controller 15 instructs the received signal level measuring unit 17 to measure the received signal strength indication (RSSI).

(Step 5)

The peripheral cell search controller 15 determines the magnitude of the change of the RSSI of the receiving band signal, based on the level measured result from the RSSI measuring unit 17. For example, this controller 15 may set a threshold value A for determining the presence of an environmental change of radio propagation from the peripheral cell, if the following relation is met for the n-th RSSI detected result R(n):

$$|R(n-1) - R(n)| \geq A$$

If the change of the RSSI is determined to be large, the operation goes to a step 6. That is, it is presumed that there exists a base station to be detected by the peripheral cell search.

If the change of the RSSI is determined to be small, (1) if the timer T1 is counted up, the operation goes to step 6.

(2) if the timer T1 is not counted up, the operation goes to step 3.

(Step 6)

The mobile station operates to sequentially set to the reverse diffuser 12 the diffusion codes used in the peripheral cells, which are stored in the diffuse code storage unit 14. Then, the received signal quality measuring unit 13 operates to measure the SIR from each cell.

Afterwards, the mobile station operates to report the result of the peripheral cell search to the network. Herein, the report to the network at each peripheral cell search has been described as an example. In actuality a report at each search is not necessarily required.

After reporting the result of the peripheral cell search to the network, the operation goes to the Step 2.

The mobile station executes the peripheral cell search along the procedure from the Step 1 to the Step 6.

As described above, according to the first embodiment of the invention, if the propagation environment of a radio signal from a base station for servicing the peripheral cells is abruptly changed, the mobile station quickly detects the change within a time period $\Delta t1$ in the worst case, executes the peripheral cell search, and shifts to the soft hand-over state with a proper base station.

(Second Embodiment)

The second embodiment of the present invention is concerned with a modification of the mobile station according to the first embodiment, which determines whether or not the environment around the subject station has lots of obstacles (buildings or mountains) for obstructing the wave propagation by measuring the period of RSSI variations in the receiving band measured by the RSSI measuring unit, and changes the period of the peripheral cell search to a shorter period if the environment is determined to have lots of obstacles or to a longer period if it is determined not to have lots of obstacles. As such, the mobile station provides the capability of autonomously determining whether or not the environment around the mobile station has lots of obstacles and adaptively increasing or decreasing the period at which peripheral cell searches are executed.

Figure 4:
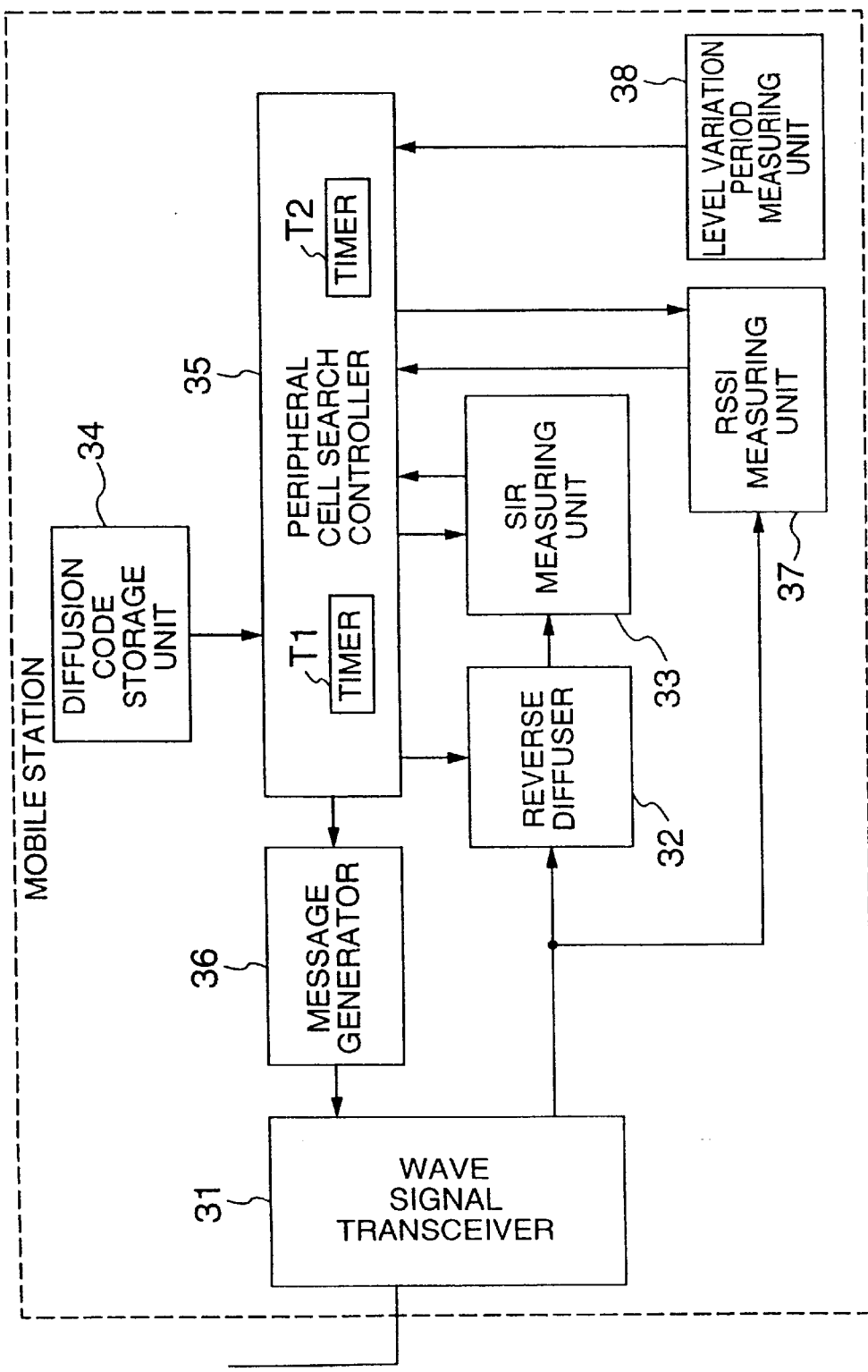
FIG. 4 is a block diagram showing an arrangement of a mobile station according to a second embodiment of the invention.

FIG. 4 is a block diagram showing an arrangement of a mobile station for executing the peripheral cell search according to the second embodiment of the invention. In FIG. 4, the mobile station includes a radio signal transceiver 31 for transmitting and receiving a radio signal to and from a base station, a reverse diffuser 32 for reversely diffusing a diffused signal received by the radio signal transceiver 31 by using diffusion codes and taking a signal oriented for the subject station, a received signal quality measuring unit 33 for measuring the SIR, a diffusion code storage unit 34 for storing the diffusion codes used in the peripheral cells and reported on a perch channel, a peripheral cell search controller 35 for executing a peripheral cell search at a pre-set timer period, the controller 35 being provided with timers T1 and T2, a message generator 36 for generating a message for notifying the network of the result of the peripheral cell search periodically executed by the controller 35, and a RSSI measuring unit 37 for measuring the RSSI of the receiving band signal sent from the radio signal transceiver 31.

Figure 5:
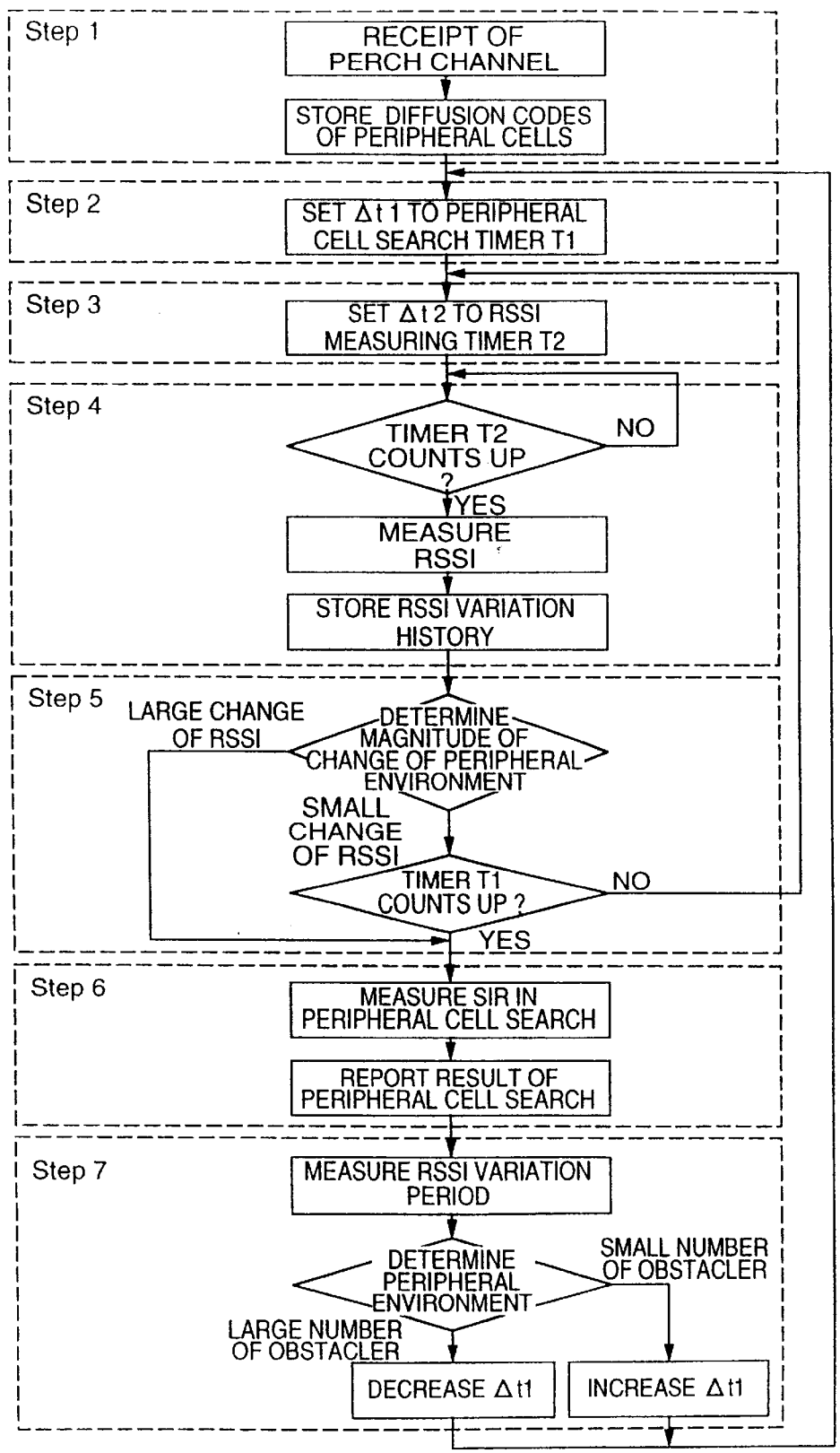
FIG. 5 is a flowchart for illustrating the operation of searching a peripheral cell in a mobile station according to the second embodiment of the invention.

The description will be oriented to the operation about the peripheral cell search executed by the mobile station arranged as described above according to the second embodiment of the invention with reference to FIG. 5.

(Step 1)

The mobile station receives a signal on the perch channel, obtains the information about diffusion codes to be used by the peripheral cells, and stores it in the diffusion code storage unit 34.

(Step 2)

The peripheral cell search controller 35 operates to set a cell search execution period $\Delta t1$ to the timer T1.

(Step 3)

The peripheral cell search controller 35 operates to set a RSSI measuring period $\Delta t2$ to the timer T2.

Herein, the relation $\Delta t2 < \Delta t1$ is required. If $\Delta t2 = \Delta t1/k$ (k=2, 3, 4, ...), by executing the detection of the received signal level k times within one period of the peripheral cell search, the detection can be executed at 1/k time of the peripheral cell search period. Hence, a mobile station can recognize the abrupt change of the received signal quality from the peripheral cell.

(Step 4)

When the timer T2 is counted up, the peripheral cell search controller 15 instructs the received signal level measuring unit 17 to measure the received signal strength indication (RSSI).

The level variation period measuring unit 38 stores the RSSI measured result as the RSSI varying history.

(Step 5)

The peripheral cell search controller 35 determines the magnitude of the RSSI change in the receiving band signal, based on the RSSI measured result sent from the RSSI measuring unit 37 (Peripheral Environment Determination 1).

For example, this controller 35 may set a threshold value A for determining the presence of an environmental change of radio propagation from the peripheral cell, if the following relation is met for the n-th RSSI detected result R(n);

$$|R(n-1)-R(n)| \geq A$$

If the change of the RSSI is determined to be large, the operation goes to a step 6. That is, it is presumed that there exists a base station to be detected by the peripheral cell search.

If the change of the RSSI is determined to be small, (1) if the timer T1 is counted up, the operation goes to step 3.

(2) if the timer T1 is not counted up, the operation goes to step 3.

(Step 6)

The mobile station operates to sequentially set to the reverse diffuser 32 the diffusion codes used in the peripheral cells, which are stored in the diffuse code storage unit 34. Then, the received signal quality measuring unit 33 operates to measure the SIR from each cell.

Afterwards, the mobile station operates to report the result of the peripheral cell search to the network. Herein, the report to the network at each peripheral cell search has been described as an example. In actuality, the report at each search is not necessarily required.

After reporting the result of the peripheral cell search to the network, the operation goes to the Step 2.

(Step 7)

The level variation period measuring unit 38 operates to measure the RSSI variation period based on the RSSI variation history. For example, the measuring unit 38 may operate such that the RSSI measured result from the RSSI measuring unit 37 is quantized at L stages and the time when the quantized value is not varied is measured as the RSSI variation history.

The peripheral cell search controller 35 operates to determine whether or not the peripheral environment has lots of obstacles, based on the RSSI variation period measured by the RSSI variation period measuring unit 38. For example, the controller 35 may operate such that a threshold value B for determining whether or not the environment has lots of obstacles is pre-set to the measured result LT of the RSSI variation period; and (1) If LT<B, the environment is determined to have lots of obstacles and Δt1 is decreased accordingly, or (2) If LT≧B, the environment is determined not to have lots of obstacles and Δt1 is increased accordingly.

Along the procedure of these Steps 1 to 7, the mobile station executes the peripheral cell search.

As described above, according to the second embodiment of the present invention, the mobile station operates to autonomously determine whether or not the environment around the mobile station itself has lots of obstacles and set a proper period for the peripheral cell search based on the determined result. Hence, if the environment therearound has lots of obstacles, the mobile station executes the peripheral cell search at a short period for corresponding to the change of the received signal quality from the peripheral cell. If the environment therearound does not have lots of obstacles, the mobile station executes the peripheral cell search at a long period. This procedure makes it possible for the mobile station to eliminate unnecessary peripheral cell searches.

Figure 6:
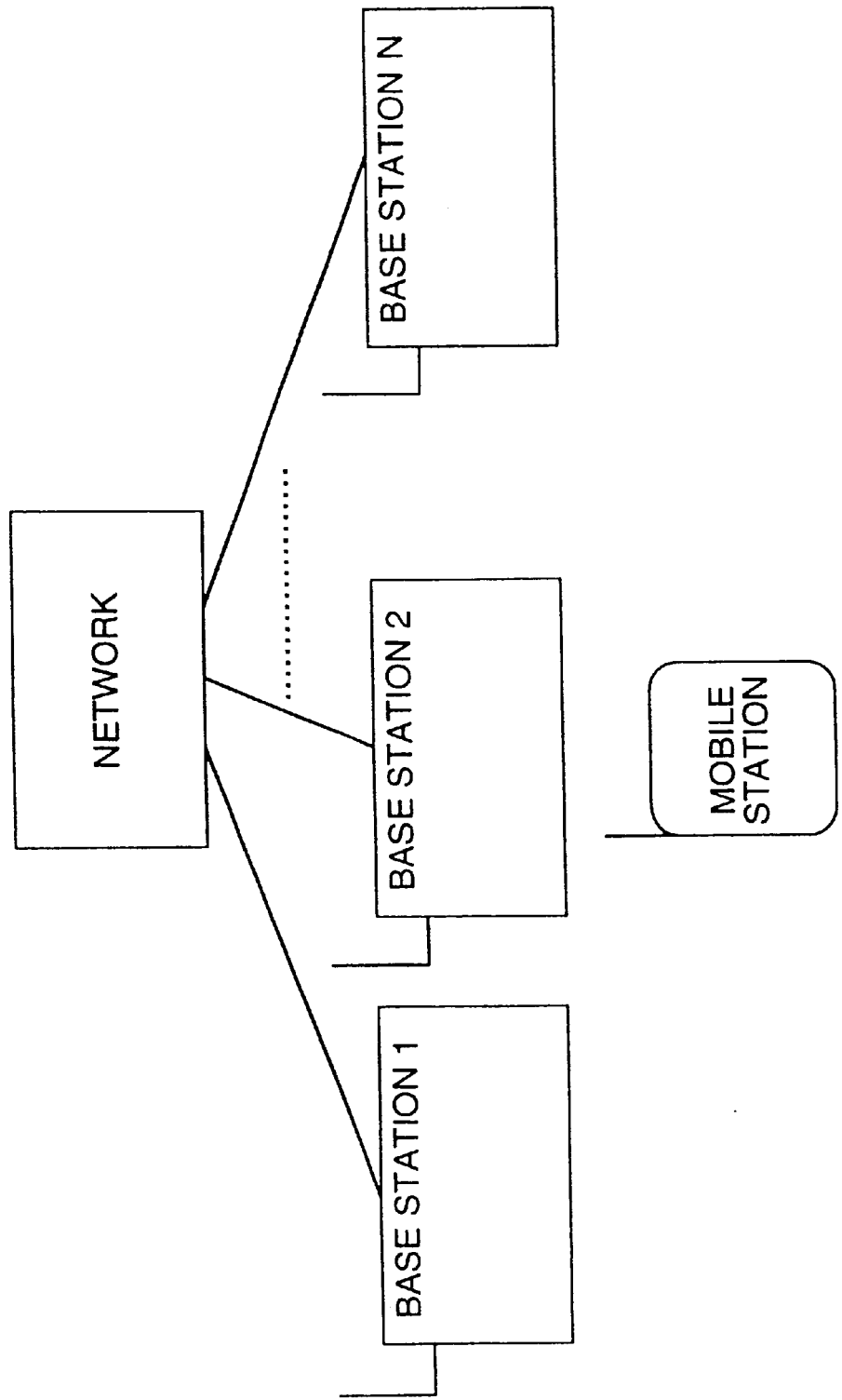
FIG. 6 is a block diagram showing an arrangement of a mobile communication system according to the present invention.

Moreover, as shown in FIG. 6, a mobile communication system may be arranged to have the mobile station described according to the foregoing embodiments and base stations 1 to N. This mobile communication system provides a capability of suppressing an increase of interference if the mobile station is moved from an out-of-sight place to an in-sight place. This arrangement makes it possible to implement a mobile communication system for suppressing an increase of interference in the case of moving the mobile station from the out-of-sight place to the in-sight place.

As set forth above, according to the present invention, if the propagation environment of the radio signal from the base station for servicing the peripheral cell is abruptly changed, the mobile station operates to autonomously detect the change, immediately execute the peripheral cell search, and report the quality measured result to the network. The network can instruct the soft hand-over to the mobile station.

What is claimed is:

1. A communication method for use by a mobile station in a mobile communication system of CDMA (Code Division Multiple Access) type, comprising:

(a) transmitting and receiving signals to and from base stations servicing respective peripheral cells, step (a) being conducted by a transceiver;

(b) measuring a received signal strength indicator (carrier RSSI) specifying wide-band receiving power within a predetermined channel bandwidth of a signal received by said transceiver;

(c) reversely diffusing or despreading signals received by said transceiver to generate despread signals;

(d) measuring a signal to interference noise ratio (SIR) of said despread signals, step (d) being conducted by an SIR measuring means;

(e) executing a search among said peripheral cells and controlling said SIR measuring means to measure the SIR at certain periods and at least when a change of the RSSI measured in step (b) exceeds a predetermined value, and reporting the SIR for said peripheral cells to a network through a base station in communication with said mobile station so as to shift said mobile station to a soft hand-over state and;

(f) measuring a variation period of the RSSI measured in step (b) and determining whether or not the environment around said mobile station has a number of obstacles which obstruct propagation of a radio wave;

wherein step (e) further comprises changing a searching period of said peripheral cells to a shorter period when said environment is determined to have a number of obstacles and changing the searching period of said peripheral cell to a longer period when said environment is determined not to have a number of obstacles.

2. A communication method for use by a mobile station in a mobile communication system of CDMA (Code Division Multiple Access) type, comprising:

(a) transmitting and receiving signals to and from base stations servicing respective peripheral cells, step (a) being conducted by a transceiver;

(b) measuring a received signal strength indicator (carrier RSSI) specifying wide-band receiving power within a predetermined channel bandwidth of a signal received by said transceiver;

(c) reversely diffusing or despreading signals received by said transceiver to generate despread signals;

(d) measuring a signal to interference noise ratio (SIR) of said despread signals, step (d) being conducted by an SIR measuring means;

(e) executing a search among said peripheral cells and controlling said SIR measuring means to measure the SIR at certain periods and at least when a change of the RSSI measured in step (b) exceeds a predetermined value, and reporting the SIR for said peripheral cells to a network through a base station in communication with said mobile station so as to shift said mobile station to a soft hand-over state and;

(f) measuring a variation period of the RSSI measured in step (b) and determining whether or not the environment around said mobile station has a number of obstacles which obstruct propagation of a radio wave;

wherein step (e) further comprises changing a searching period of said peripheral cells to a shorter period when said environment is determined to have a number of obstacles and changing the searching period of said peripheral cell to a longer period when said environment is determined not to have a number of obstacles, and wherein when said mobile station is moved from an out-of-sight place of one of said base stations to an in-sight place thereof, an increase of interference is suppressed.

* * * * *